United States Patent Office 2,970,010
Patented Jan. 31, 1961

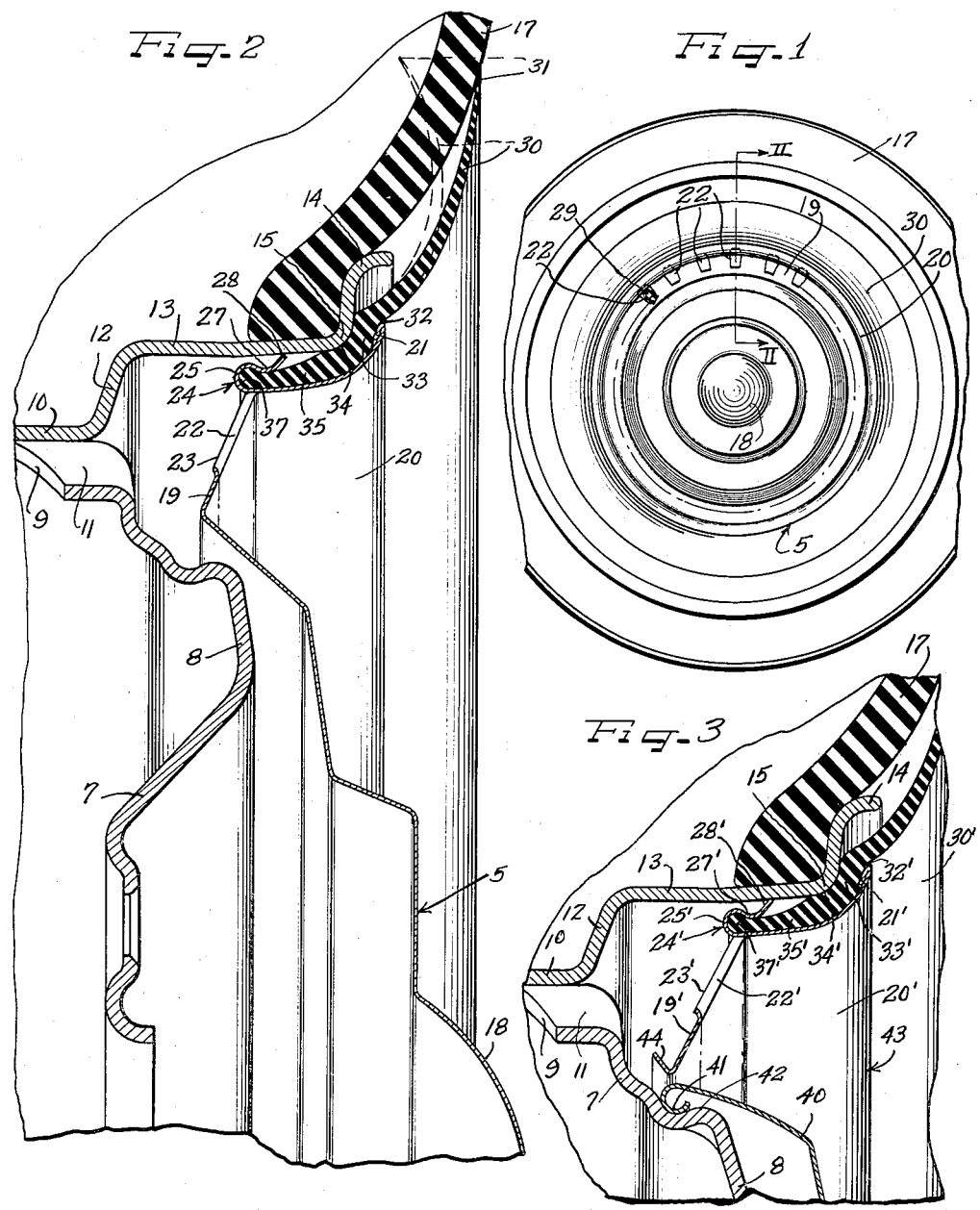

2,970,010

WHEEL COVER

George Albert Lyon, 13881 W. Chicago Blvd.,
Detroit 28, Mich.

Filed Sept. 30, 1957, Ser. No. 686,997

7 Claims. (Cl. 301—37)

The present invention relates to improvements in wheel structures and more particularly concerns the ornamental and protective covering of the outer sides of vehicle wheels with the provision of novel means for providing a wheel with a simulated white or other colored sidewall for a tire on the wheel.

For ornamental purposes, automobile tires are commonly provided with white sidewalls, the remainder of the tire being of more or less black appearance. The white rubber used for the white sidewall is applied as a veneer and is of a different composition from the remainder or body of the tire and actually requires a different vulcanizing treatment, to the extent that the temperature and time of cure are somewhat different from the black rubber of the tire body. This has created some necessity for compromise in the vulcanization of tires with white sidewalls, generally resulting in a sacrifice of quality in the body of the tire including the tread and principal sidewall portions thereof.

To overcome the disadvantages of cure compromise, it has been proposed to secure the white sidewall portions or veneer to the sidewalls of the tires after the tires have been vulcanized. Such after-attached sidewall members are inherently liable to such disadvantages as peeling, and the like, and of course require a separate attaching or vulcanizing operation and equipment that raises costs.

It has also been heretofore proposed to provide separate simulated white sidewall ring members that are secured between the terminal flange of the tire rim and the bead portion of the tire sidewall and separably hug the sidewall of the tire. Such simulated or mock tire white sidewall rings require that the tire be deflated in order to install the ring members. Should such simulated sidewall rings become damaged, it is necessary to deflate the tire not only to remove the damaged ring but also to replace the ring. Furthermore, disadvantage of such simulated white sidewall rings is that, especially with tubeless tires there is apt to be interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing and other difficulties and disadvantages of the prior expedients and to provide a simulated tire sidewall of improved appearance and which can be applied or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member which is adapted for optional assembly with a wheel cover for disposition over the outer side of the wheel.

Yet another object of the invention is to provide a tire sidewall simulating flexible ring device which is adapted to be carried in seated engagement with the outer side of a tire rim.

It is a further object of the invention to provide a novel tire sidewall simulating extension ring structure which is adapted to be carried by a wheel cover and in assembly with the wheel serves as cushioning and turn-preventing means for the wheel cover to avoid distortion of a valve stem that projects through a portion of the wheel cover.

A still further object of the invention is to provide a novel tire sidewall simulating ring member of elastic material provided with means for coacting with retaining fingers on a wheel trim member to enhance the retaining engagement of the retaining fingers with a wheel part.

Other objects, features and advantages of the present invention will be readily apparent from the following detailed description of certain preferred embodiments thereof taken in conjunction with the accompanying drawing, in which:

Figure 1 is an outer side elevational view of a vehicle wheel embodying features of the invention;

Figure 2 is an enlarged fragmentary radial sectional detail view taken substantially on the line II—II of Figure 1; and Figure 3 is a fragmentary sectional detail view similar to Figure 2 but showing a modification.

Having reference to Figures 1 and 2, a wheel cover 5 of the full disk type is constructed and arranged and is of a diameter to substantially overlie the outer side of a vehicle wheel including a wheel body 7 having an intermediate annular axially outwardly projecting reinforcing nose bulge 8 and provided at its outer margin with a peripheral axially inwardly projecting attachment flange 9 suitably attached to an annular radially inwardly facing base flange 10 of a tire rim and providing at juncture with the tire rim a series of annularly spaced wheel openings 11 through which air may circulate through the wheel for cooling a brake drum (not shown) of an axle structure to which the wheel may be attached in the customary manner.

The tire rim includes a side flange 12 extending generally radially outwardly from the outer margin of the base flange 10 and merging with a generally axially outwardly extending and radially inwardly facing intermediate flange 13 that joins a generally radially outwardly and then axially outwardly extending terminal flange 14 on a rounded annular generally radially outwardly and axially inwardly facing juncture shoulder 15. A pneumatic tire 17 which may be of the tubeless type is adapted to be supported by the tire rim and has an incurving sidewall overlying the terminal flange 14 and more particularly extending generally radially and axially outwardly beyond the terminal flange.

As a practical matter, the wheel cover 5 is adapted to be made from suitable metallic sheet or strip stock such as stainless steel, brass, or the like press die stamped and drawn to provide a preferred contour herein including a central wheel body overlying crown portion 18 having thereabout an annular generally axially inwardly dished or depressed portion 19 which is adapted to fit into the generally axially outwardly opening substantial groove over the juncture of the wheel body and tire rim. At its outer margin, the wheel cover is provided with an annular generally arched radially and axially outwardly directed rib-like marginal portion 20 having the outer edge thereof turned under to provide a reinforcing and finishing edge 21 for the cover adapted to overlie the outer side of the tire rim and more particularly the rim shoulder 15.

Means are provided for not only enabling air circulation through the cover but also to provide cover retaining fingers and to this end the intermediate annular portion 19 of the cover is provided with an annular series of openings 22 affording air circulation apertures that are generally aligned with the wheel openings 11. Each of the apertures 22 is provided about its periphery with a finishing and reinforcing inturned flange 23. It will be observed that the apertures 22 are of generally quadragular form, and are provided at the radially outer sides with turned cover retaining respective fingers 24 derived from the material struck from the openings 22.

In a preferred form, the retaining fingers 24 are formed as inward extensions from the inner edge of the annular cover marginal portion 20 and as extensions of the inturned reinforcing flange 23, comprising turned loop radially outwardly turned and axially inwardly projecting portions 25 from which extends in each instance a generally axially outwardly and radially inwardly projecting retaining finger leg 27 terminating in a generally axially and radially outwardly oblique short and stiff retaining terminal 28 which is engageable retainingly with the inner surface of the intermediate flange 13. For this purpose, the tips of the terminals 28 normally extend to a slightly larger diameter than the diameter of the inner surface of the intermediate flange 13 and more particularly the axially outer portion thereof. It will be appreciated that each of the retaining fingers 24 is of relatively flexible but stiffly resilient nature attained by cold working of the material thereof so that when the fingers are compressed radially inwardly by the engagement with the intermediate flange 13, they are resiliently deflected and thus placed under resilient tension to assure cover retaining gripping of the intermediate flange.

In applying the cover 5 to the outer side of the wheel, a valve stem 29 carried by the side flange 12 of the wheel rim is adapted to be centered to project through one of the cover openings 22 and the cover is then pressed axially inwardly into mounted relation upon the wheel.

Although the cover 5 may, if desired, be utilized by itself over the outer side of the wheel, it is adapted to carry and retain in engagement with the wheel a tire sidewall simulating extension ring member 30 which may be in the form of a white sidewall simulating member or may be provided in some other preferred color for decorative or design purposes. By preference, the tire sidewall simulating ring member 30 is made from a suitable rubber or rubber-like elastic material, butyl having been found to be excellent for the purpose. This material is characterized by excellent durometer control, high quality pigmentation capability, desirable resiliency and elasticity with nevertheless high flexibility, and withal durability as well as ease of moldability and vulcanization for mass production purposes.

In a preferred construction, the non-metallic side-wall simulating ring member 30 is formed in concave, convex arched cross-section generally similar to the incurve of the tire sidewall when assembled with the tire. However, to enable self-positioning, continuous hugging engagement and following or adjustment with respect to the tire sidewall in any condition of inflation or deflation of the tire in any circumferential portion thereof, including "live" movements in the running of the tire with the wheel, the ring member 30 is constructed in the tire sidewall overlapping portion thereof normally to assume a smaller radius cross-sectional shape substantially as shown in dash outline in Figure 2, wherein at least the radially outer portion of the ring member, including a feather edge 31 at its radially outer extremity, is disposed more axially inwardly than in an axially outwardly flexed, resiliently tensioned tire sidewall engaging condition or position as shown in full outline in Figure 2. This relationship assures the firm face-to-face hugging self-adjustable relation of the edge 31 against the tire sidewall under resilient tension.

Resilient tensioning under the flexed mounted condition of the ring member 30 is enhanced by the structure thereof whereby it is of increased thickness radially inwardly from the tire sidewall engaging tip or edge extremity terminus 31 thereof, with the tapering thickness greatest toward the radially inner portion of the ring member and especially in the area thereof where it is adapted to be engaged by the margin of the cover 5 and the tire rim. As shown, the curvature or transversely or cross-sectionally arched form of the ring member 30 is such that it provides in the mounted relation over the wheel a substantial chamber therebehind for accommodating wheel-balancing weights that may be attached to the terminal flange 14. To this end, the inner marginal portion of the ring member 30 extends generally radially and axially inwardly and provides a generally axially outwardly opening groove 32 nestingly receptive of the cover edge formation 21. Extending angularly, radially inwardly from the groove 32 and joined at such groove with the main body portion of the ring 30, is an annular seating flange 33 which, at its axially outer side, internestingly engages with the radially and axially outer portion of the cover marginal portion 20. At its axially inner side the ring member flange 33 provides a generally axially inwardly and radially outwardly facing annular seating groove 34 receptive of and bottomed in the assembly or seated on the tire rim shoulder 15 in the mounted condition of the assembly. Through this arrangement, the edge structure 21 of the cover 5, and the outer portion of the cover margin 20 coact with the inner marginal structure of the ring member 30 to maintain the ring member in concentric assembly and to clamp the ring member flange 33 against the tire rim. Furthermore, the turned cover edge 21 provides a fulcrum about which the ring member 30 is adapted to be swung axially outwardly into an open relation selectively for such purposes as gaining access to the chamber behind the ring member to apply or remove or change wheel balancing weights with respect to the tire rim terminal flange 14.

In order thoroughly to retain the inner marginal structure of the ring member 30 against withdrawal or pull-out from the clamped engagement between the cover margin and the tire rim, an interlocked relationship of the ring marginal structure with the cover is provided. To this end, as well as to enable unitary handling of the cover 5 and the ring member 30, an inner marginal generally axially inwardly projecting annular flange extension 35 from the ring marginal flange 33 is provided. This flange extension 35 is preferably constructed for generally conformed engagement with the radially outer side of the axially inner portion of the cover marginal portion 20 so as to be engageable between the cover margin and the intermediate flange 13.

At its inner terminus, the ring member flange 35 is constructed to engage within the loops 25 of the retaining fingers 24. For this purpose, the inner terminus of the flange 35 is provided with a terminal annular bead 37 dimensioned to be gripped interlockingly within the finger loop portions 25 and with the generally radially inwardly projecting finger legs 27 interlockingly overlying the bead 37. This interlocking relationship is enhanced in the mounted condition of the cover on the outer side of the wheel by the radially inward flexing of the retaining fingers. Moreover, by having the thickness of the portion of the flange 35 between the fingers and the opposing back of the cover marginal portion 20, resilient back-up is afforded by the material of the flange 35 for the retaining finger legs 37 to thereby increase the resilient tensioning thrust of the retaining fingers and thus gripping of the finger terminals 28 against the intermediate flange 13 of the tire rim.

The construction and relationship of the ring member flanges 33 and 35 is such that by engagement between the opposed shoulders afforded by respectively the radially outwardly turned extremity of the marginal cover portion 20 and the retaining finger loops 25 retention of the ring member against axial displacement on the cover is afforded. Moreover, by preference the ring member flange 35 is made of a slightly smaller inside diameter than the outside diameter of the engaged cover marginal portion 20, so that in assembling the flange 35 with the cover, there is a slight elastic stretching of the flange 35 and thereby effective gripping thereby of the cover marginal portion 20 under resilient tension. Through this arrangement, the ring member 30 and the cover are adapted to be handled as a unit.

In applying the cover 5, with the ring member 30 carried in unitary assembly therewith, to the outer side of the wheel, the tire sidewall engaging tip 31 of the ring member is carried into engagement with the tire sidewall, and as the cover is pushed axially inwardly home onto the wheel, the ring member 30 is placed under resilient tensioned engagement with the tire sidewall by the flexing of the outer portion of the ring member from the dash line position in Figure 2 to the full outline position. In the fully assembled, or mounted marginally bottomed relation of the wheel cover and ring member with respect to the tire rim and more particularly the tire rim shoulder 15, the marginal portion of the ring member not only affords a cushion for the overlying cover portions but also serves as a vibration damping, sound deadening structure. In this respect, the inner marginal structure of the ring member 30 affords cushioning with respect to axially inwardly imposed forces on the cover margin, and also cushioning against road shocks or other forces in a radial or diametrical direction. Also, since the material from which the ring member 30 is made as a high coefficient of friction and a substantial area of the inner marginal structure, and more especially the ring member flange 33 engages the tire rim, while an even larger area of the ring margin engages the margin of the cover, substantial resistance to turning of the cover on the wheel is afforded in association with the retaining finger terminals 28 which also afford substantial resistance to turning of the cover as well as resistance to axial displacement of the cover from the wheel. This prevents distortions of the valve stem 29. For removing the cover 5 from the wheel, the ring member 30 is flexed locally axially outwardly and a pry-off tool such as a screwdriver may then be inserted behind the cover marginal portion 20 by introduction of the tip of the pry-off tool behind the ring marginal flange 33 and application of axially outward pry-off force for sliding the tips of the retaining finger terminals 28 axially outwardly from their engagement with the intermediate flange 13 of the tire rim. During this pry-off, the resilient ring flange 33 affords protection against pry-off tool damage or denting of the cover marginal portion 20.

In the modification of Figure 3, an arrangement is shown wherein the invention is adapted for use as a trim ring assembly optionally usable with a hub cap 40 applied to the outer side of the wheel body as by snapping of a marginal resilient bead 41 over a suitable annular series of spaced cover retaining bumps 42 on the radially outer side of the nose bulge 8 of the wheel body, other details of the wheel being the same as in Figure 2 and similarly identified. In this instance, all features of the non-metallic sidewall simulating extension ring member may be substantially the same as the ring member 30 of Figures 1 and 2 and all portions thereof are identified by primed reference numerals to indicate similarity and the applicability of the description of the details of the ring member 30 thereto. Moreover, the ring member 30' is retained on the wheel in the same manner as the ring member 30 by a metallic circular trim ring member 43 which, although it may be, if preferred, made as a rolled section. The features in association with the inner marginal flange structure 34', 35', 37' of the sidwall ring member 30' are substantially the same as the marginal structure of the cover 5 and for that reason similar primed reference numerals have been applied with the understanding that the description of the corresponding features or elements of the cover 5 apply equally thereto. The principal difference in the trim ring 43 resides in that instead of the axially innermost portion 19' being a dished intermediate portion of a full disk cover, this portion 19' comprises a radially inner flange extension directed generally radially and axially inwardly from the innermost portion of the ring body 20' from adjacent juncture therewith of the retaining fingers 24' and of an inside diameter such as to approach closely the terminal flange bead 41 of the hub cap. Thereby, in the complete assembly on the wheel, the trim ring member 43 appears substantially as though emanating from the edge of the hub cap 40 and thus affords the general effect of a full wheel cover on the wheel. In this instance, the inner margin of the ring portion 19' is provided with a generally underturned continuous annular generally radially outwardly and axially inwardly extending reinforcing and finishing flange 44 which is disposed generally in opposition to the wheel body 7 as a positive limit stop but is preferably normally spaced therefrom. In addition, the edge extremity of the ring portion 19' is so disposed, as for example in the spaced or gap relation shown and sufficiently axially inwardly to enable application conveniently of a pry-off tool behind the hub cap bead 41. Application and removal of the trim ring assembly is adapted to be effected the same as described in connection with the cover 5.

It will be understood that modifications and variations may be effected without departing from the scope of the novel concepts of the present invention.

I claim as my invention:

1. In a wheel structure including a wheel body and a multi-flange tire rim supported thereby for carrying a pneumatic tire, a trim assembly including a non-metallic tire sidewall simulating ring member having an inner margin engageable with the tire rim, and a metallic circular member having a radially outer marginal portion overlyingly disposed to said inner marginal portion of the sidewall ring member for clamping the same against the tire rim, said circular member having radially inwardly adjacent to said outer marginal portion an annular series of apertures from which material is derived and shaped to provide a series of retaining fingers turned under said outer marginal portion of the circular member and clampingly engaged with the inner marginal extremity of said sidewall simulating ring member and having portions thereof for assembly retaining engagement with the tire rim.

2. In a wheel structure including a wheel body and a tire rim with air circulation openings adjacent juncture of the rim and body, a trim structure for disposition over the outer side of the wheel including a non-metallic tire sidewall simulating ring member for overlying a sidewall of a tire supported by the rim and also for overlying a portion of the rim, and a metallic circular member having a marginal portion for clampingly overlying the inner marginal portion of said non-metallic ring and a portion extending radially inwardly from said marginal portion and having an annular series of apertures therein disposed for air circulation coaction with the wheel openings, material from said apertures being bent in behind said marginal portion and providing cover retaining fingers with which the inner extremity of the marginal portion of the non-metallic ring is clampingly interengaged.

3. In a wheel structure including a wheel body and a tire rim with air circulation openings adjacent juncture of the rim and body, a trim structure for disposition over the outer side of the wheel including a non-metallic tire sidewall simulating ring member for overlying a sidewall of a tire supported by the rim and also for overlying a portion of the rim, and a metallic circular member having a marginal portion for clampingly overlying the inner marginal portion of said non-metallic ring and a portion extending radially inwardly from said marginal portion and having an annular series of apertures therein disposed for air circulation coaction with the wheel openings, material from said apertures being bent in behind said marginal portion and providing cover retaining fingers with which the inner extremity of the marginal portion of the non-metallic ring is clampingly interengaged, said fingers having juncture loops and the inner marginal portion extremity of the non-metallic ring having an annular continuous bead interlock in said loops of the fingers.

4. In a wheel structure including a wheel body and a tire rim with air circulation openings adjacent juncture of the rim and body, a trim structure for disposition over the outer side of the wheel including a non-metallic tire sidewall simulating ring member for overlying a sidewall of a tire supported by the rim and also for overlying a portion of the rim, and a metallic circular member having a marginal portion for clampingly overlying the inner marginal portion of said non-metallic ring and a portion extending radially inwardly from said marginal portion and having an annular series of apertures therein disposed for air circulation coaction with the wheel openings, material from said apertures being bent in behind said marginal portion and providing cover retaining fingers with which the inner extremity of the marginal portion of the non-metallic ring is clampingly interengaged, said fingers having juncture loops and the inner marginal portion extremity of the non-metallic ring having an annular continuous bead interlocked in said loops of the fingers, said fingers being resiliently deflected into interlocking relation with said bead by engagement of the fingers with the tire rim.

5. In a trim structure for disposition over the outer side of a vehicle wheel, a non-metallic tire sidewall simulating ring member, and a circular sheet metal member for carrying the non-metallic ring member and including a marginal portion interlocked with the inner marginal portion of the non-metallic member, said marginal portion of the metal member having radially adjacent thereto a circular portion provided with a plurality of apertures from which material has been struck and turned under and providing retaining tabs for the inner marginal portion of the non-metallic ring member, said retaining tabs gripping said inner marginal portion of the ring member so that the members can be handled as a unit.

6. In a trim structure for disposition over the outer side of a vehicle wheel, a non-metallic tire sidewall simulating ring member, and a circular sheet metal member for carrying the non-metallic ring member and including a marginal portion interlocked with the inner marginal portion of the non-metallic member, said marginal portion of the metal member having radially adjacent thereto a circular portion provided with a plurality of apertures from which material has been struck and turned under and providing retaining tabs for the inner marginal portion of the non-metallic ring member, said tabs providing loops and the inner marginal portion of the non-metallic ring member having an annular bead interengaged within said loops.

7. In a trim structure for disposition at the outer side of a vehicle wheel, a tire sidewall simulating non-metallic flexible ring member having an inner margin, a circular sheet metal member having a marginal portion interengaged with the margin of the non-metallic ring member and extending radially inwardly from said marginal portion an annular portion having a plurality of apertures therein with the radially outer ends of the apertures generally coincident with said marginal portion of the circular member and with the material struck from the apertures providing loop finger extensions from the circular member marginal portion and turned behind said ring member marginal portion and retainingly interengaging with the extremity of the non-metallic member margin so that the members can be handled as a unit.

References Cited in the file of this patent

UNITED STATES PATENTS

| 2,016,251 | Lyon | Oct. 1, 1935 |
| 2,757,972 | Lyon | Aug. 7, 1956 |
| 2,575,973 | Lyon | Aug. 7, 1956 |

FOREIGN PATENTS

| 1,161,278 | France | Nov. 25, 1953 |
| 61,528 | France | Nov. 24, 1954 |